United States Patent
Pohlmann et al.

(10) Patent No.: US 6,366,926 B1
(45) Date of Patent: Apr. 2, 2002

(54) METHOD AND APPARATUS FOR THE DYNAMIC FILTERING AND ROUTING OF EVENTS

(75) Inventors: William N. Pohlmann, Newtown Square, PA (US); Kenneth D. Matson, Bellevue, WA (US); Paul Cantrell, Sudbury, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/224,482

(22) Filed: Dec. 31, 1998

(Under 37 CFR 1.47)

(51) Int. Cl.[7] .................................................. G06F 17/00
(52) U.S. Cl. ..................................... 707/104.1; 709/318
(58) Field of Search ............................... 707/100, 104, 707/104.1; 709/318, 217

(56) References Cited

U.S. PATENT DOCUMENTS

| 5,165,018 | A | * | 11/1992 | Simor | 709/222 |
| 5,459,717 | A | * | 10/1995 | Mullan et al. | 370/351 |
| 5,881,315 | A | | 3/1999 | Cohen | |
| 5,974,417 | A | * | 10/1999 | Bracho et al. | 707/10 |
| 6,021,443 | A | * | 2/2000 | Bracho et al. | 709/241 |
| 6,148,338 | A | * | 11/2000 | Lachelt et al. | 709/224 |
| 6,216,132 | B1 | * | 4/2001 | Chandra et al. | 707/103 |
| 6,289,384 | B1 | * | 9/2001 | Whipple et al. | 709/229 |

OTHER PUBLICATIONS

Rosenblum et al "A design framework for internet–scale event observation and notification", ACM SIGSOFT Software Engineering Notes, Vol. 22, Issue 6, Nov. 1997.*

* cited by examiner

Primary Examiner—Thomas Black
Assistant Examiner—Uyen Le
(74) Attorney, Agent, or Firm—Baker & McKenzie

(57) ABSTRACT

A method for routing a subscription request defined by an event filter. The method includes parsing the event filter into an evaluation tree having at least one subexpression, locating the at least one subexpression and determining if the at least one subexpression includes a node specific field. If the at least one subexpression includes a node specific field, the method includes creating a list of nodes and event manager contact information and transmitting the subscription request to at least one event manager located on a node that is included on a list of nodes.

8 Claims, 7 Drawing Sheets

METHOD AND APPARATUS FOR THE DYNAMIC FILTERING AND ROUTING OF EVENTS

FIELD OF THE INVENTION

The present invention relates to the field of event management systems, in particular to dynamic filtering and routing of events within the event management system.

BACKGROUND INFORMATION

Information technology (IT) has evolved from mainframe-only computing to complex, highly distributed computer systems spanning across desktops and departments through networks. These distributed computing environments provide benefits, including the flexibility to select any number of platforms, domains, tools, and network configurations. The distributed environments, however, may be complex. Further, there may exist a lack of compatibility and integration between software tools and platforms. For example, conventional point products (e.g., Platinum DBVision product) are generally directed to a specific function or area of expertise such as a solution for database monitoring and management, job scheduling, or managing database reorganizations. Each point product provides a specific capability and each also includes a distinct interface. On the other hand, utilizing framework technology provides an integrated solution, although tool functionality is significantly sacrificed. Further, maintaining the current enterprise environment utilizing either conventional point products or framework technology involves a large amount of resources and money from IT organizations.

Accordingly, a need exists for an integrated system for providing tools that utilize a compatible interface dynamic and allow filtering and routing of events without significantly sacrificing tool functionality.

SUMMARY OF THE INVENTION

An object of the present invention is providing an integrated system for routing events occurring in point products through a common event management system.

Another object of the present invention is the dynamic filtering of events across nodes of an enterprise.

An aspect of the present invention provides a method for routing a subscription request defined by an event filter. The method parses the event filter into an evaluation tree having at least one subexpression, locates the at least one subexpression and determines if the at least one subexpression includes a node specific field. If the at least one subexpression includes a node specific field, the method also creates a list of nodes and event manager contact information, and transmits the subscription request to at least one event manager located on a node that is included on the list of nodes.

DETAILED DESCRIPTION

Figure 1:
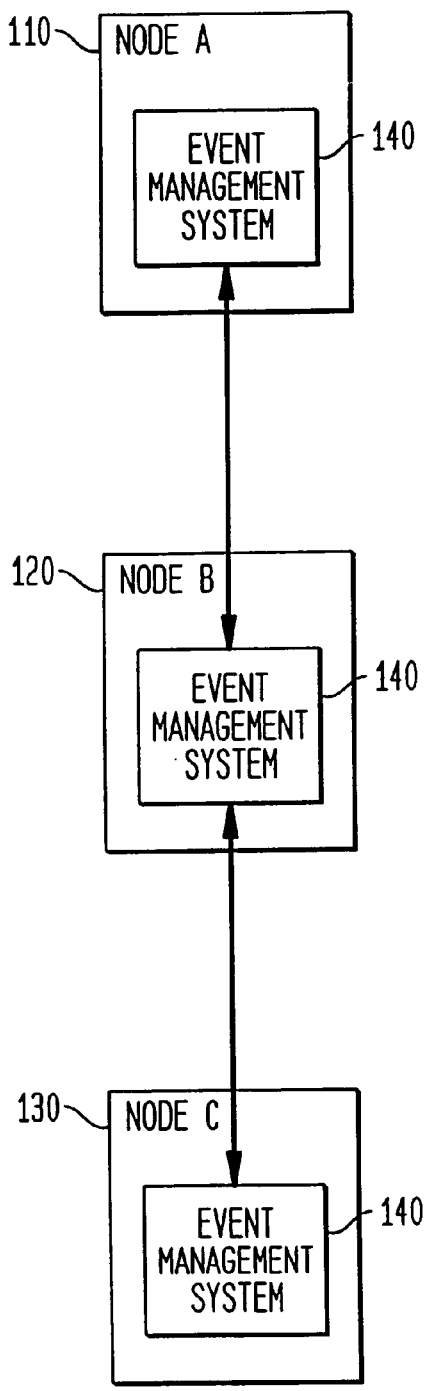
FIG. 1 shows an exemplary embodiment of an enterprise of the present invention including a plurality of nodes.

The event management system of the present invention manages an enterprise (e.g., a computer network such as a local area network (LAN) or wide area network (WAN)), correlates event information occurring in the enterprise, and takes corrective actions based on predetermined response policies. The event management system receives, for example, event messages from compatible point products within the enterprise. As shown in FIG. 1, the enterprise 100 may include a plurality of nodes 110, 120, 130 which may, for example, be connected by a network (not shown). A node is, for example, a physical box such as a personal computer, server, etc. that runs an operating system. In an exemplary embodiment of the present invention, a node may be a personal computer having a compatible point product installed on it. In an exemplary embodiment of the present invention, the event management system 140 manages events on the nodes 110, 120, 130 where the events are generated, minimizing the movement of data on the network and keeping actions such as evaluation, reporting and automated correction of data close to the source.

Figure 2:
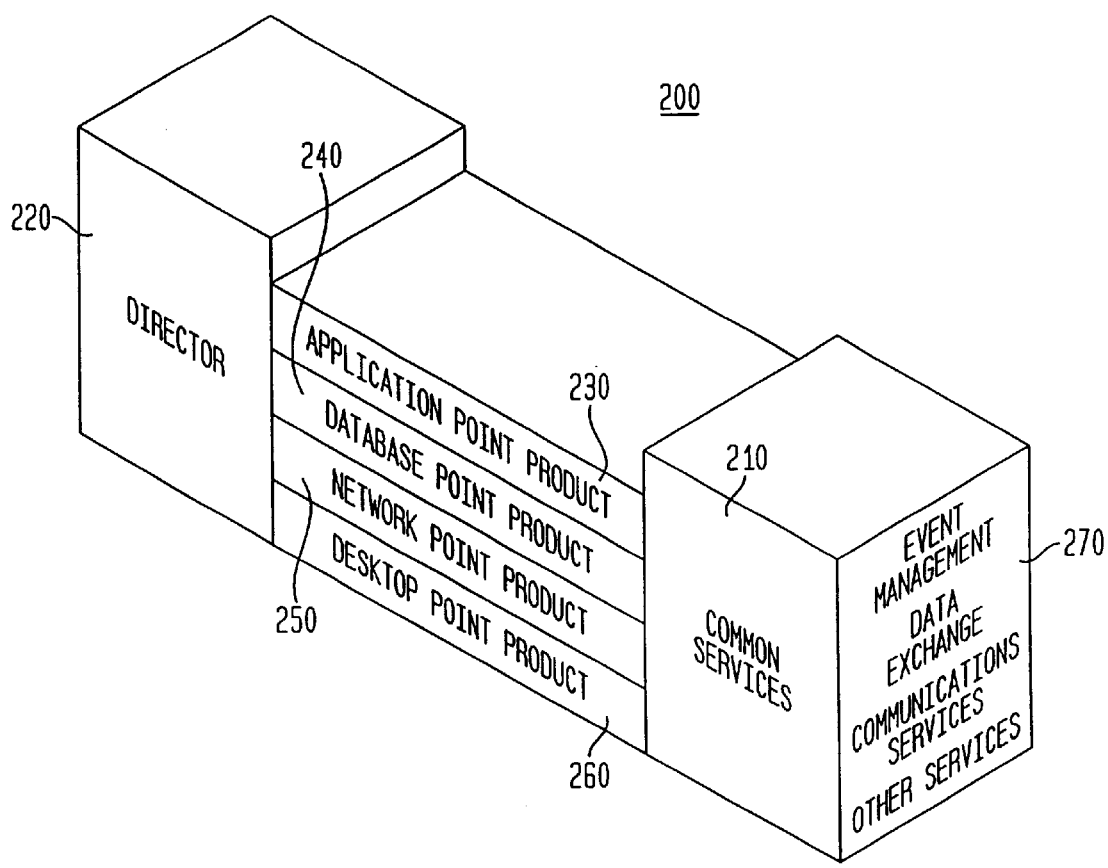
FIG. 2 shows an exemplary embodiment of a suite of integrated point products of the present invention.

In an exemplary embodiment of the present invention as shown in FIG. 2, the event management system 270 may be included in a suite 200 of integrated tools including compatible point products used to, for example, manage applications, databases, desktops, networks, and systems. The tools 230, 240, 250, 260 may use a set of common services 210 to share data relating to events. A director 220 is, for example, a shared, common graphical user interface (GUI) running in a conventional server computer for compatible point products 230, 240, 250, 260. In an exemplary embodiment of the present invention, the director 220 runs under Windows NT and Windows 95, and operates as a single console that allows users to view and interact with all resources including compatible point products 230, 240, 250, 260 in the enterprise.

The primary manageable unit of information utilized by the event management system of the present invention is a structured message called an event. An event represents information about some significant occurrence by or to a resource in the enterprise. Events are sent and received by compatible point products and event managers in the event management system. Events are, for example, the basic building blocks of real-time information processing used to manage the enterprise. Events define the fundamental element of publishable, sharable information and the format in which the events should be maintained and transmitted. The structure of an event includes, for example, predefined fields for the fundamental information necessary for any event record. The predetermined fields fall into two categories: identifying fields and non-identifying fields. Identifying fields are fields that taken together form a unique key for the event, distinguishing it from another event. Non-identifying fields are fields that add additional information about an event but do not participate in the key of the event. The event management system of the present invention allows the event structure to be extended by a user by dynamically adding key value pairs and thus, uniquely defining the respective event structure. Accordingly, the addition of key value pairs to an event structure enables a point product to publish the uniquely-defined event that otherwise would not have been published because it would not have been uniquely defined by the predetermined fields of the event.

An exemplary embodiment of an event structure according to an embodiment of the present invention is defined below, for example, in the C language.

```
typedef struct_PT_EVENT
{
int             Version;       /* Event structure version          */
PT_CHAR_T       *Node;         /* Node of event                    */
PT_CHAR_T       *Class;        /* Event class                      */
PT_CHAR_T       *Instance;     /* Originating product
                                  instance                         */
PT_CHAR_T       *Name;         /* Event name                       */
PT_CHAR_T       *Time;         /* Event time (yyyymmdd
                                  hh24miss)                        */
PT_CHAR_T       *CondTime;     /* Condition time
                                  (yyyymmdd hh24miss)              */
PT_CHAR_T       *AgentNode;    /* Node where detecting
                                  agent is running                 */
PT_CHAR_T       *EvmgrNode;    /* Node where responsible
                                  event mgr runs                   */
PT_EVENT_TYPE   Type;          /* Event type
                                  (EV_DISCRETE . . . )             */
PT_RESP_TYPE    Response;      /* Response type
                                  (EVRE_SILENCE . . . )            */
PT_CHAR_T       *RespPolicy;   /* Response Policy                  */
PT_CHAR_T       *Descr;        /* Description                      */
PT_CHAR_T       *DescrId;      /* Message string key
                                  for MsgPut                       */
PT_CHAR_T       *DescrFields;  /* Field list for substitution
                                  in message                       */
double          Value;         /* Value (for condition/
                                  alarm events)                    */
int             Level;         /* Alarm level (for type =
                                  EV_ALARM_SET)                    */
PT_CHAR_T       *IntKeys;      /* Application specific
                                  internal keys                    */
int             NumKey;        /* Number of key/value
                                  pairs following                  */
PT_CHAR_T       **Keys;        /* Array of other key
                                  (attribute) names                */
PT_CHAR_T       **Values;      /* Array of other key
                                  (attribute) values               */
BOOL            Archived;      /* Boolean flag, TRUE if
                                  event archived                   */
PT_CHAR_T       *Id;           /* Unique event id                  */
PT_CHAR_T       *CondId;       /* Condition id                     */
int             RepeatCount;   /* Count of duplicate events
                                  of this type used for storm
                                  suppression                      */
int             HopCount;      /* Here comes Peter
                                  Cotton Tail . . .                */
PT_CHAR_T       *GMTOffset;    /* GMT Offset                       */
int             ActionTaken;   /* Boolean flag, Response
                                  action in progress               */
BOOL            Silenced;      /* Boolean flag,
                                  Alarm silenced                   */
PT_CHAR_T       *ProductName;  /* Product name of
                                  submitting product               */
PT_CHAR_T       *InstanceType; /* Type of instance in
                                  Instance                         */
void            *localParam;   /* Hook to allow local
                                  associated data with event       */
PT_CHAR_T       *AuthString;   /* Placeholder for
                                  authorization string, some
                                  form of event content
                                  signature                        */
PT_CHAR_T       *TTId;         /* Trouble ticket id                */
PT_CHAR_T       *TTStatus;     /* Trouble ticket status            */
}_PT-EVENT;
```

The identifying fields of the exemplary event are node, name, product, instance, type, condition_time if the type is not discrete, event time if the type is discrete, all key value pairs including the contents of the keys field array and values field array (with the field, for example NumKeys, including a number indicating the number of key value pairs in their respective field arrays). All of the other predefined fields are non-identifying fields.

The events may be categorized into a plurality of types including, for example, discrete events, conditions and alarms. Discrete events are events which indicate that something occurred at a particular time and are completely self-contained. The occurrence for a discrete event has no state and does not get updated. A failed logon attempt, for example, may invoke the generation of a discrete event. Conditions are events that indicate the state of something that is persistent over a period of time and may have attributes that are updated. The events declared by a product are owned by that product. Generally, only the respective point product can update or clear the condition events generated at the point product. The contents of discrete and condition events represent real information about the enterprise that cannot be changed without changing the occurrence that causes the event. An alarm is, for example, an interpretation of other events based on a user configurable policy. Accordingly, the user could clear an alarm at anytime without resolving the condition that caused it. Similarly, the alarm can persist beyond the clearing of an event upon which the alarm is based.

Figure 3:
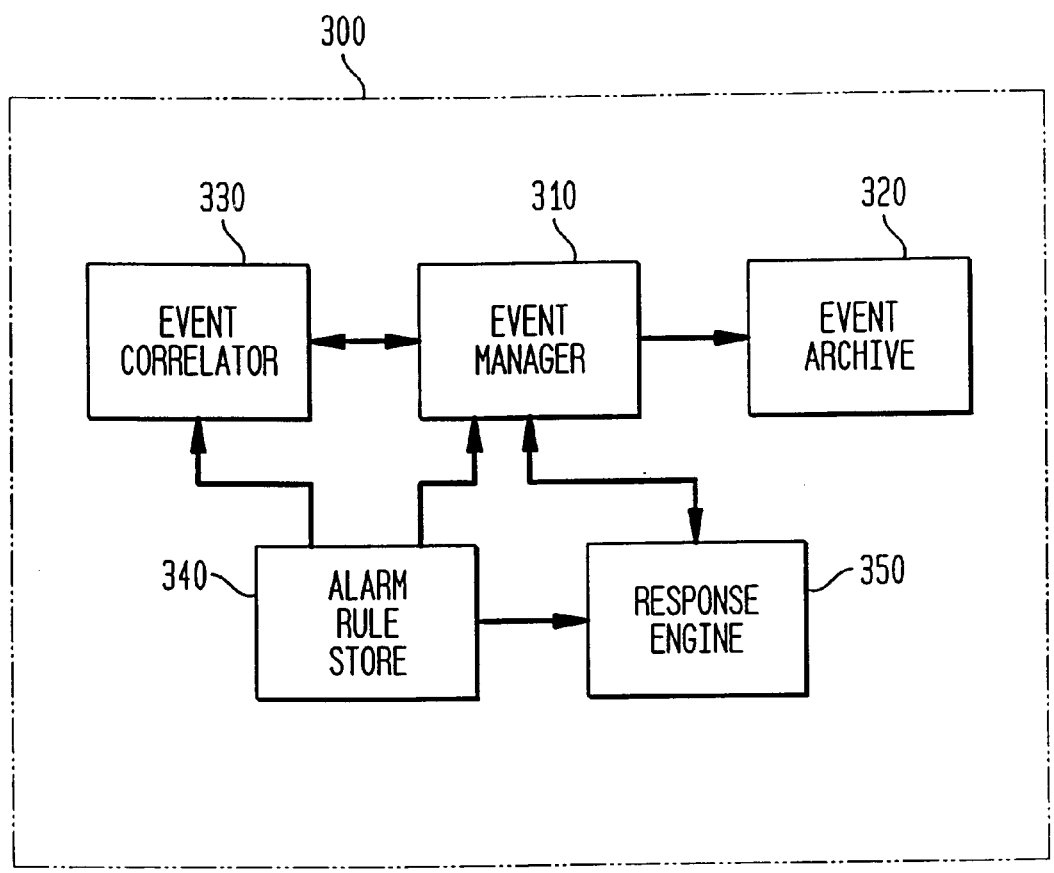
FIG. 3 shows an exemplary embodiment of a block diagram of an event management system of the present invention.

As shown in FIG. 3, an exemplary embodiment of an event management system 300 of the present invention includes an event manager 310, event archive 320, event correlator 330, alarm rule store 340, and a response engine 350. In an exemplary embodiment of the present invention, an event manager 310, event archive 320, event correlator 330, and a response engine 350 are included on all nodes of the enterprise and the alarm rule store 340 is included on a central node allowing events to be stored and managed locally.

In an exemplary embodiment of the present invention, an event management system may, for example, receive event messages from point products, for example, throughout an enterprise. Events are managed on a node of the enterprise where the events are received by an event manager 310 located on the respective node. The event manager 310 may, for example, receive all events, maintain the states of previously sent events, maintain a list of subscriptions, and route events to the appropriate subscribers. In an exemplary embodiment of the present invention, the events and their state and the list of subscriptions may be stored locally.

Figure 4:
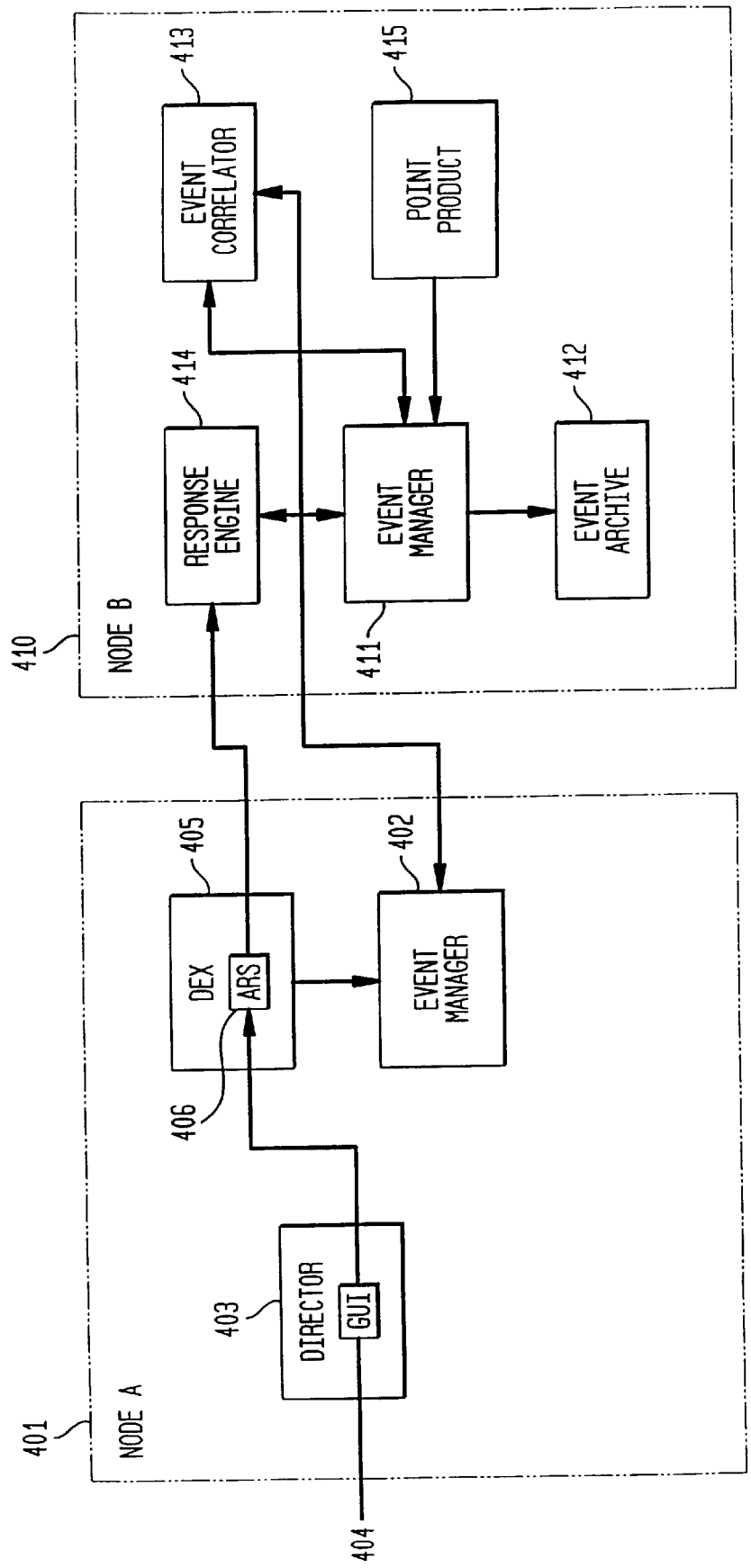
FIG. 4 shows an exemplary embodiment of event information communicated between a plurality of nodes of the event management system of the present invention.

As shown in FIG. 4, the event manager 402 of node a 401 and the event manager 411 of node b 410 also receive event information from the event correlator 413 of node b 410. The event manager 411 of node b 410 also provides events to the event correlator 413 on node b. The event manager 411 also receives event information from point product 415, where events are actually occurring. Event manager 402, 411 maintain, for example, the events and their associated state and a list of subscriptions. Each event manager may have a local memory data store, blackboard, where statefull events are stored. The blackboard may be kept persistent in a file based storage, for recovery of the information across generations (process invocation of the event manager). The clients subscribing to events are responsible for reestablishing the respective subscriptions across new invocations of the event manager. Accordingly, the subscriptions may be maintained in memory. The local event archive is maintained for all the events received by the event manager. The event management system of the present invention also may correlate events from multiple nodes. In an exemplary embodiment of the present invention, the event management system provides views of events consolidated to single management stations or in views/categories that cross node boundaries.

The event management system of the present invention is structured to query or express outstanding interest in groups of events by criteria other than node through event subscription. Event subscription allows the specification of criteria on the contents of the fields of the event. Determining the events of interest to a particular process can be analogized, for example, to writing a database query that requests records matching criteria on various fields of the record. The request of the present invention differs from a normal data base query in that it is not solely a request for data already in existence, but an ongoing request for a collection of events that have yet to occur or exist.

When a subscription is made for an event such as, for example, an event occurring at a point product 415, a subscription request is sent to event manager 411 on node b 410. The event manager 411 receives the request and adds this request to its list of outstanding requests which may be stored, for example, in memory. The event manager 411 checks outstanding events previously stored, for example, in a blackboard, to see if it matches the request criteria. Each matching event is forwarded, e.g., published, to the requester, e.g., the subscriber of the event. Any new events which are received and match the subscription criteria are also forwarded. This may continue until the subscription is canceled.

In an exemplary embodiment of the present invention, a subscription is assigned a unique ID when it is formed. The unique ID and a datagroup from which this request came, uniquely defines the subscription. A subscription is canceled, for example, by calling an API with a returned request handle from the original subscription. This results in sending a cancel message to the event manager with the respective request ID. The event manager can then match the cancel request to the original subscription and remove it from a processing queue of the event manager.

All events published on a node are received by the event manager of the node. The event manager also receives and maintains all requests sent by processes from its node and other nodes. Upon receipt of an event, the event manager also assigns an event ID. The event manager determines if the event is a condition and if so, the event manager checks, for example, a blackboard to determine if the event matches an existing condition. If so, the condition event is assigned a condition ID of the existing condition and applied as an update to the existing condition. Further, if archiving is enabled, the event is archived. In an exemplary embodiment of the present invention, for example, the archiving may include storing the event in a database such as a flat file archive. A separate file may be used for each calendar day. Events may be written to the archive for the day of the time stamp in the event as newline delimited records in the order in which they are received. The event manager also checks all outstanding subscription requests. For any event other than a condition update, if the received event matches the request, the event manager forwards the event to the requestor. In the case of an update to a condition, it is the event as updated that is matched against the request. Accordingly, it is the updated event that the event manager forwards to the requestor.

Event filters describe identifying criteria for the events of interest and allow specification of various forms of comparison that can be specified for each of the fields of an event including key value pairs of the extended event structure. An event filter is, for example, a Boolean expression made up of subexpressions that compare a field of an event with a user specified value. Event filters are, for example, similar to the "WHERE" clause in Structured Query Language (SQL). The fundamental subexpression of an event filter is, for example, a phrase comparing a field of an event with a value, e.g., node=ptisun20. The subexpression node=ptisun20 means that the node field of the event must exactly match the string "ptisun20". Any of the fields of the event structure can be used as the node field is used in the example, with the exception of the keys field array and values field array which require a special syntax. For example, if one of the key value pairs added was:

| key | value |
|---|---|
| FileSystem | /usr, | an exact match filter for this key value pair would be keyfield.FileSystem="/usr". Further, testing for the existence of a key with any value could be done by testing that it not match a null value, e.g., keyfield.FileSystem !="". The event filters may be stored any place a text string could be stored, for example, in a configuration file such as a flat text file, in a database, in memory, as C source code (e.g., hard coded in a program), etc.

Filtering is also available on the values of key value pairs of the event. As in the earlier example, there may be a key "FileSystem" with an associated value that is the name of a specific file system. The desired events may only be those for a certain file system, for instance /usr. The filter mechanism for corresponding values of a key specifies the key and tests the associated value. A special syntax is used to distinguish keys from other fields of the event that allows a different name space for the keys from the predefined fields of the event. The syntax is "keyfield.[name]". An example testing for the value /usr of a key value pair would be, for example, keyfield.FileSystem=/usr.

In an exemplary embodiment of the present invention, the event filter may include comparison operators such as = and full regular expression match specified with the operator "like". A filter, for example, could be node=ptisun05. A filter matching all node values that follow a pattern of ptisun[#] would be node like "ptisun[0–9]+". The following is an exemplary list of event filter comparison operators: >= (greater than or equal), <= (less than or equal), > (greater than), < (less than), = (equal), like (matches a regular expression), likeci (case insensitive string match), and != (not equal).

In an exemplary embodiment of the present invention, the following tokens, production rules, and event filter definition implemented using yet another compiler compiler (yacc) may be used.

```
%token NO_MORE_TOKENS
%token FILTER
%token <symp> NAME
%token <symp> FUNC_PART
%token <keywp> BOOLEAN
%token <keywp> COMPOP
%token <keywp> SEPARATOR
%token <keywp> LEFTPAREN
%token <keywp> RIGHTPAREN
/* get rid of expression grammar shift/reduce conflict */
%left BOOLEAN
%type <evalp> filter
%type <evalp> statement
%%
``` statement: FILTER filter NO_MORE_ _TOKENS_
filter: NAME COMPOP NAME
  | FUNC_PART SEPARATOR NAME COMPOP NAME
  | NAME COMPOP FUNC_PART SEPARATOR NAME
  | filter BOOLEAN filter
  | LEFTPAREN filter RIGHTPAREN In an exemplary embodiment of the present invention, the event manager 411 may be implemented as a daemon (e.g., an agent program that continuously operates on a UNIX server and provides resources to client systems on the network). Upon receiving an event, the event manager 411 determines the disposition of the event, including whether it has already received the event and whether the event state has changed. The event manager 411 also writes the event to a local event archive 412 and routes the event to all clients that subscribe to the event content. For example, the event manager 411 may provide event information to the event correlator 413 and the event manager on a node 402. The event archive 412 may include an event archive service processor. The event archive 412 service processor reads events from the event archive. Subscribers may include any event correlator 413 instance that has an alarm rule subscribing to the event and, for example, a director containing a resource object or a product subscribing to update events about the contents in a central storage such as a data exchange service (DEX).

The event correlator 413 may include, for example, an event correlator service processor. The event correlator 413, as described in copending patent application U.S Ser. No. 09/224,487 filed on Dec. 31, 1998 and entitled SYSTEM AND METHOD FOR DYNAMIC CORRELATION OF EVENTS which is herein incorporated by reference in its entirety, implements a user-policy specified in a correlation rule. An alarm is a type of event that provides notification to subscribers of a significant condition or occurrence. The determination of an alarm may include the presence of a single event, the presence of a certain existing state(s) when another event occurs, or the recurrence of a particular event within a fixed time window. Further, an alarm may be a combination of the recurrence of a particular event within a fixed time window when certain state or states are present.

The events that determine if an alarm occurs may be due to events on the same node as the event correlator 413 or may come from one or more other nodes 401, 410. An alarm may also be associated with an automated response policy on declaration allowing a response engine 414 to handle any automated notification or correction of the alarm. The event correlator 413 can create, for example, an alarm, a modified version of a received event, or an entirely new event that can be correlated by another alarm rule.

Events may be correlated through an alarm rule. The basis of an alarm rule is the determination of the events that should be analyzed. Alarm rules can be created to define which single event or set of events represent a significant occurrence to which to respond. The alarm rule may include a description and logic describing the events that represent an occurrence and a definition of the response of the event management system to the occurrence. The result of correlation is the creation of one or more events. An alarm rule may be defined, for example, through the director 404.

The response engine 414 executes a response policy. The response engine 414 includes a plurality of processes. The response policy is, for example, a logical expression containing a list of actions connected by logic statements that is invoked by a triggering alarm generated by the event correlator 413. Multiple actions can be defined and be performed in the response policy. In an exemplary embodiment of the present invention, the multiple actions may be in a listed sequence, or added with logic to make each action contingent upon the receipt of a return code of another action or a specified field sent in the alarm. The response policy may be created by defining a set of actions and composing an expression that references one or more of these actions in a logical sequence. The actions may be global and called by multiple response policies. In an exemplary embodiment of the present invention, the response engine 414 also adds information about the success of each action to the triggering alarm at the completion of each step. This may be accomplished, for example, by sending an update alarm event that updates the event with the sequential number of the step just completed, the type of the step (e.g., email/page), and in the event archive the name of the action step. This information may be accessed through a director.

In an exemplary embodiment of the present invention, the response engine 414 may include, for example, a first process, a second process, and a third process. The first process subscribes to events sent by an event correlator 413 running on the same node 410 as the response engine 414. Upon receipt of an alarm that has an associated response policy, the first process invokes the second process to perform the policy. The first process can invoke multiple instances of the second process depending upon the settings in configuration files associated with the respective processes. The second process performs an action requiring the sending of events and calls the third process to perform any other actions. The third process of the response engine 414 may also perform a response policy action requiring a call to the operating system, such as sending an email message, invoking a script, sending a page, writing a message to a file, or forwarding the event as a simple network management protocol (SNMP) trap.

In an exemplary embodiment of the present invention, the event management system of the present invention may include a routing algorithm. The routing algorithm may be stored, for example, in random access memory or a disk drive within a conventional computer system such as an IBM® personal computer. The routing algorithm analyzes an event filter to determine the event managers that should receive the subscription request. The respective event managers will be the event managers on nodes of the enterprise that have point products that could create events that may satisfy the event filter being analyzed.

In an exemplary embodiment of an event structure of the present invention, the event structure includes, for example, three node specific fields: agent node, node, and event manager node. In an exemplary embodiment of the present invention, the routing algorithm determines whether a node specific field is included in the event filter and if so, the event filter should be routed to an event manager on the respective nodes indicated by the node specific fields. For example, if the event filter was "node=nodeA or node=nodeB", then the routing algorithm will determine, for example, that the event filter may be routed to the event manager on node A as indicated by the subexpression "node=nodeA" and the event manager on node B as indicated by the subexpression "node=nodeB". A subexpression is an expression in an event filter which includes a field name, comparator and a value. Conjunctives are used in an event filter to combine subexpressions.

Figure 5:
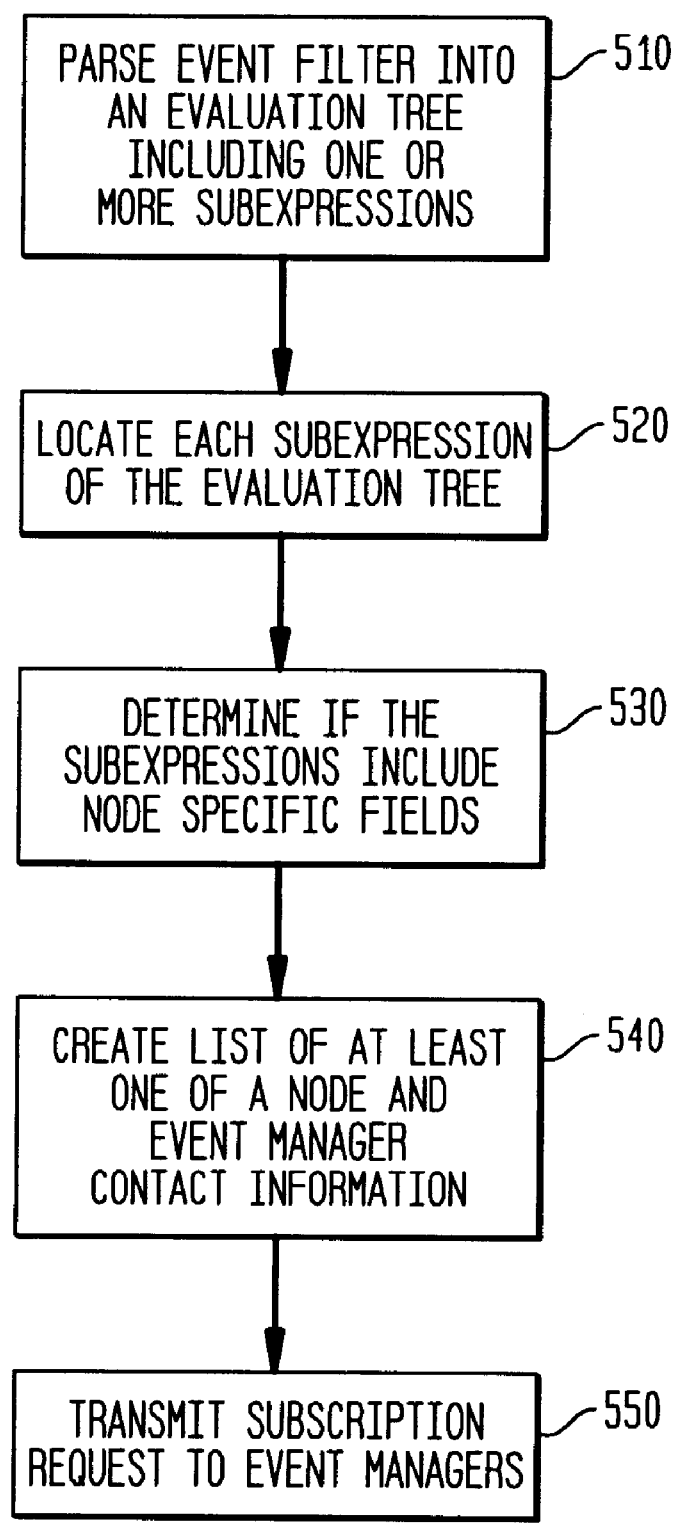
FIG. 5 shows an exemplary embodiment of a flow diagram of a routing process according to the present invention.

In an exemplary embodiment of the present invention as shown in FIG. 5, the routing algorithm, for example, parses the event filter into an evaluation tree including one or more subexpressions as shown in 510. In 520, the routing algorithm locates each of the subexpressions of the evaluation tree and in 530 determines if the subexpressions include node specific fields (e.g., agent node, node, and event manager node). In 540, the routing algorithm creates a list, e.g., a full list, of at least one of the nodes referenced in node specific fields of the evaluation tree and information necessary to contact a particular process, event manager, on the respective nodes (e.g., event manager contact information).

In an exemplary embodiment of the present invention, the routing algorithm may obtain the event manager contact information by, for example, following a predetermined algorithmic pattern or accessing contact information stored in a central data store that may be looked up on demand. Event manager contact information for each of the respective matching nodes may be provided, for example, by a function. In 550, the routing algorithm transmits the subscription request as defined by the event filter to, for example, the respective event managers identified on the full list. The algorithm for the determination of the full node list from a given filter could be embodied, for example, in the function int SvcLookupSubNode(PT_CHAR_T* pzFilter, PT_CHAR_T***subArray, int* count). A function, for example, SvcEventSubRegister(array[I], filter, myCallbackFunction, myCallbackData, &handleForThisSubscription), may be provided with the respective event manager contact information, for example, by the filter SvcLookupSubNode and transmit the subscription request to the respective nodes.

As shown in the example below, the full list as provided by the function SvcLookupSubNode(PT_CHAR_T* pzFilter, PT_CHAR_T***subArray, int* count) may be iterated making subscriptions through a call to a function SvcEventSubRegister to each of the respective event managers as determined from the event filter.

SvcLookupSubNode(filter, &array, &arraySize); for (I=0; I++; I<arraySize)
SvcEventSubRegister(array[I], filter, myCallbackFunction, myCallbackData, &handleForThisSubscription)

In an exemplary embodiment of the present invention, the routing algorithm may determine the respective nodes which to route a subscription request based on a "like" operator in node specific fields. When a node reference field includes the "like" operator rather than a fixed node string, the value of the node specific field can not be used directly as a node reference. Instead, the routing algorithm determines all the event managers which are active. Subsequently, the nodes for each of the active event managers are determined. In an exemplary embodiment of the present invention, a communication layer mechanism may determine all processes such as event managers which have some unique characteristic, such as being registered to a well known TCP/IP port on a node to receive event messages, and determine the respective nodes of the processes. Each of the respective nodes are checked to see if any of the nodes match the like expression provided by the event filter. For example, an expression may be node like "ptisun.*". This expression would match nodes that are named ptisun01, ptisun02, ptisun03, ptisun33, etc. It would not, however, match a node ptiHP01. The list of active event managers may include, for example, ptisun01 and ptiHP01. Of the active event managers, the expression would match ptisun01 but not ptiHP01. Accordingly, the resultant list would only include contact information for ptisun01, not ptiHP01 as it failed to match the filter criteria.

Figure 6:
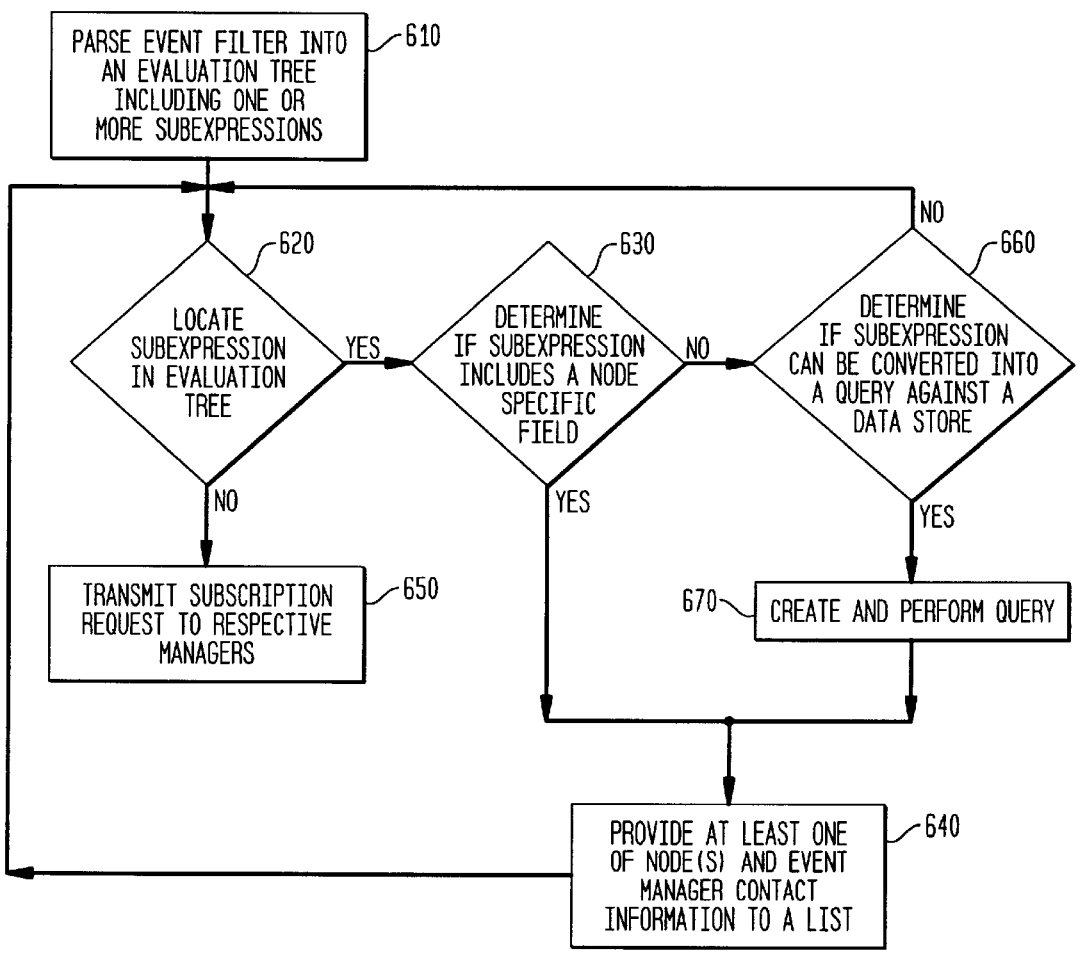
FIG. 6 shows an exemplary embodiment of a flow diagram of a routing process according to the present invention.

In an exemplary embodiment of the present invention as shown in FIG. 6, the routing algorithm, for example, parses the event filter into an evaluation tree including one or more subexpressions of the event filter as shown in 610. In 620, the routing algorithm determines if a subexpression can be located in the evaluation tree. For example, the first time the routing algorithm determines if a subexpression exists in the evaluation tree, it will locate the first subexpression. Upon locating a subexpression, the routing algorithm determines if the subexpression includes a node specific field (e.g., agent node, node, and event manager node) in 630. If so, at least one of a node and event manager contact information is provided to a list in 640. This information is appended to the list if the list already exists, otherwise the list will be created and provided with this information.

In step 630, however, if the subexpression is not determined to include a node specific field, in 660 the routing algorithm will determine whether the subexpression may be converted to a query against at least one of a data table or data store, for example, that will result in a list of nodes capable of having an event that will match the subexpression.

If it is determined in 660 that the subexpression may be converted to a query against at least one of a data table or data store, a query is created and performed against the respective data table and/or data store in 670. In 640, the results of the query (e.g., at least one of nodes and event manager contact information) are provided to the list. The results are appended to the list if the list already exists, otherwise the list will be created and provided with the results.

After the routing algorithm provides information (e.g., at least one of nodes and event manager contact information) to the list in 640 or a determination that the subexpression can not be converted into a query against a data store in 660, the routing algorithm will return to the locating step 620 until no more subexpressions can be located in the evaluation tree. If another subexpression is located in 620, the routing algorithm will again proceed with step 630, and so on. In 620, however, if no more subexpressions are located, the routing algorithm transmits the subscription request in 650 as defined by the event filter to, for example, the respective event managers identified in the full list.

In an exemplary embodiment of the present invention, the implementation of the routing algorithm may include, for example, a single function that analyzes an event filter and provides a single opaque data structure that can be accessed to determine a list of subscription handles that represent individual requests to event managers to fulfill the subscription request as determined by the routing algorithm such as
int PtEventSubscribe(PT_CHAR_T* filter,
void(*EventCallbackHandler) (PT_STATUS status, void*EvCbArg,
PT_EVAR_EVENTS_RES eventRes, PT_IPC_REQUEST request),
void*EvCbArg, void (*SubscriptionCallbackHandler) (PT_STATUS status, void*SubCbArg, PT_EVENT_SUBSCRIPTION evSubscription, void*SubCbArg).

In an exemplary embodiment of the present invention, the routing algorithm includes a plurality of data structures for the encapsulation of individual subscription requests into a single meta subscription transaction. This may be done, for example, by having a base return of a function be an opaque data structure, such as an exemplary data structure PT_EVENT_SUBSCRIPTION as shown below. PT_EVENT_SUBSCRIPTION, for example, includes the outstanding individual subscription requests and provides an acsessor function to expose it, for example, to a client (e.g., director). The data structure allows other methods such as functions acting on the data structure to reveal the contents of the data structure without the user accessing the fields of the data structure directly. Accordingly, the internal storage (e.g., the number of individual entries and contents of the fields of the data structure) may change without impacting an external user of the data structure.

In an exemplary embodiment of the present invention, the routing algorithm includes, for example, a first data structure (Subscription_List)

```
struct SUBSCRIPTION_LIST
{
PT_CHAR_T*nodeName;
PT_CHAR_T*dataGroup;
PT_IPC_REQUEST ipcRequest;
struct SUBSCRIPTION_LIST* nextSubscription;
}
``` and a second data structure (PT_EVENT_SUBSCRIPTION)

```
typedef struct_PT EVENT_SUBSCRIPTION
{
PT_CHAR_T* filter;
struct SUBSCRIPTION_LIST fullList;
struct SUBSCRIPTION_LIST workingList;} _PT_
    EVENT_SUBSCRIPTION typedef_PT_EVENT_
    SUBSCRIPTION*PT_EVENT_SUBSCRIPTION;
```

PT_Event_Subscription provides an event filter and a list of all the outstanding subscription requests, e.g., full list, for the respective event filter. PT_Event_Subscription also provides a working list which provides subscription requests which are being changed. Subscription_List is, for example, a basic element of the full list, and provides a list of separately defined elements needed to fulfill the subscription. Subscription_List includes information about each request such as an individual request handle which uniquely identifies an individual request to an event manager (e.g., inner process communication (IPC) request), for example, ipcRequest; the respective event manager contact information, for example, dataGroup; and the node where the event defined in the respective event filter may occur, for example, nodeName. The individual entries of full list are defined by the structure Subscription_List. In an exemplary embodiment of the present invention, the full list is, for example, implemented as a linked list using nextSubscription. For example, each element of the list points to the next element of the list and the final element of the list points to nothing. Accordingly, the size of the full list does not have to be predetermined.

In an exemplary embodiment of the present invention, the event management system provides a mechanism, for example, a client registered subscription callback function SubscriptionCallbackFunction(PT_STATUS status, void* SubscriptionCallbackArgument, PT_EVENT_SUBCRIPTION evSubscription) for notifying, for example, a client that a subscription request has changed. Thus, the subscription callback function allows a client, such as a director, to view the status of the PT_Event_Subscription structure and the changes, e.g., addition and deletion of requests, that were made. The registered subscription callback function may also provide a working list which includes the requests that are being changed as of, for example, the invocation of the client registered subscription callback function.

Further, the client registered subscription callback function may also provide the outstanding subscription requests, e.g., full list. The registered subscription callback function may also be used for initial subscription and any subsequent additions or deletions. For example, a call on deletion will have the working list populated with subscription_list entries including IPC requests that are to be canceled. Determining whether the working list includes additions or deletions may be accomplished through, for example, a value of a minor status in the status structure, PT_STATUS passed to the client registered subscription callback function. On a complete change to an event filter (e.g., all old requests canceled and new requests added), the callback function may be invoked twice, once with the deletions and once with the additions. In an exemplary embodiment of the present invention, the event management system also includes a function, int PtEventSubscribeCancel(PT_EVENT_SUBSCRIPTION evSubscription), for canceling a group of subscriptions.

Figure 7:
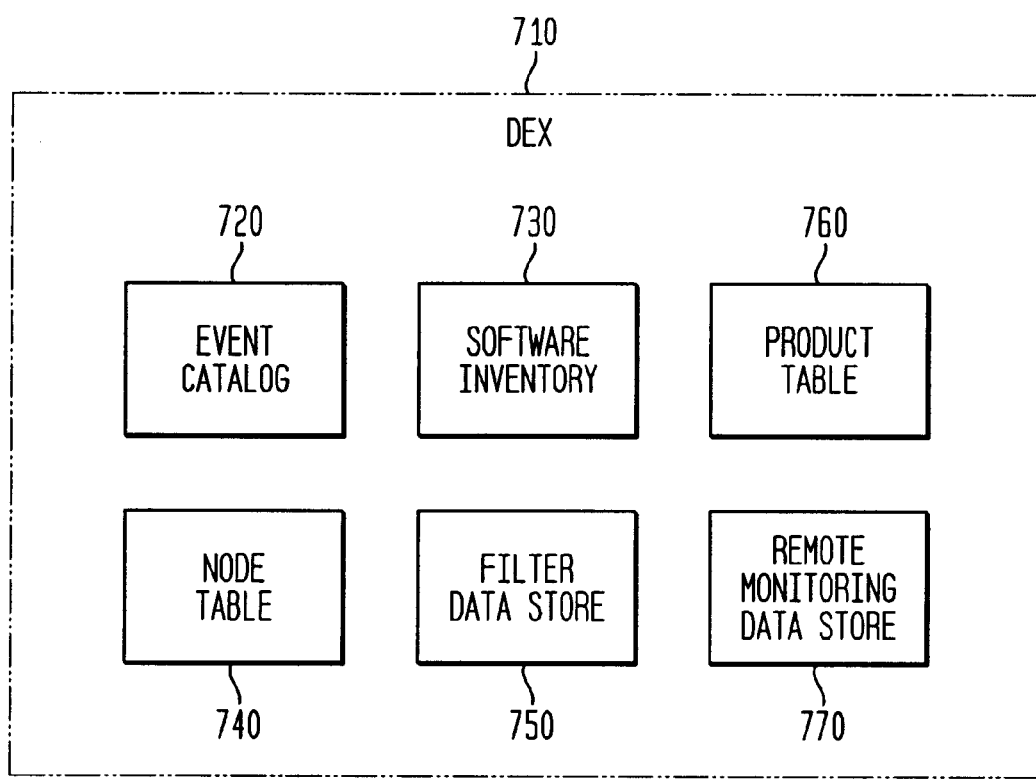
FIG. 7 shows an exemplary embodiment of a block diagram of a data exchange system of the present invention.

In an exemplary embodiment of the present invention, the routing algorithm performs a query to one or more data tables or data stores as determined from analyzing subexpressions of an evaluation tree of a respective event filter. As shown in FIG. 7, the data tables and data stores may include, for example, an event catalog 720, a software inventory 730, a product table 760, a node table 740, a filter data store 750, and a remote monitoring data store 770. The event catalog 720 may include fields of an event which are not specific to where the product reporting the event is installed or to a specific instance that the event is about such as product name, event name, type of event, description, description ID, instance type, and all of the additional extended keys used by this event. In an exemplary embodiment of the present invention, this information may be provided with the installation of the respective database such as the DEX 710 or the installation of a point product, which may include updating the event catalog 720 with the events generated by the point product. In an exemplary embodiment of the present invention, the GUI, for example, of the director guides a user through an event filter creation process including populating pick lists of options for various fields of events which inform the user of the events available in the enterprise as described in Platinum Provision Common Services Reference Guide, version 1.08 (October 1998 Platinum technology, inc.) which is herein incorporated by reference in its entirety. The lists are populated by, for example, querying the event catalog 720 that may be, for example, located in the DEX 710 as shown in FIG. 7.

In an exemplary embodiment of the present invention, the event management system of the present invention may include a software inventory 730. The software inventory 730 may include records for each copy of a product installed on a node, for example, information indicating the respective nodes where each of the point products are installed and a list of instances being monitored. The software inventory 730 may use a product identifier (product ID) and a node identifier (node ID) to form the respective relationships. Further, a given product can be installed on multiple nodes and a node may have more than one product installed on it. The software inventory 730 may be included, for example, in the DEX 710. Information indicating where a given product is installed may be useful to determine the nodes that could have a particular type of event occur on it.

In an exemplary embodiment of the present invention, the event catalog 720 and software inventory 730 may be located, for example, in a single relational data store. Accordingly, an event filter may be effectively translated into a database query to determine what nodes could have such an event occur on them. For example, a query may be used for a filter referencing a product name, e.g., "productName=PlatPerfMgmtOra". Accordingly, the routing algorithm will, for example, perform a query against the event catalog 720, to get from the product name reference in the event catalog 720 an associated product ID. The product ID is, for example, a generated key that is used across all of the database tables when referring to the product. In an exemplary embodiment of the present invention, the product ID could be, for example, the name or an integer. This ID can then be used to reference information (e.g., a record) from the software inventory 730 that associates a physical node with a product. An event name field may be used by the routing algorithm to query the event catalog 720 for products that may generate the respective event. For example, in the filter "name=DatabaseDown", the event name is DatabaseDown. A query could be performed against the event catalog 720 to determine what products can generate events with that name. From the list of products, a query against the software inventory 730 could be made to determine on what nodes such products are installed. Based on performance and ease of integration in the dynamic construction of the query, for example, the query may include multiple queries, nested queries, or a single query with suitable conjunctives. As was done for the event name, similar queries may be constructed for the other fields in the event catalog 720, using the event catalog 720 to determine the products in the event catalog 720 that are related to the respective field, and then where those products are installed. In an exemplary embodiment of the present invention, the other fields in the event catalog 720 may include type of event, description, description ID, instance type and all of the additional extended keys used by events. The addition of key value pairs to an event structure is described in copending patent application U.S. Ser. No. 09/224,808 filed on Dec. 31, 1998 and entitled METHOD AND APPARATUS FOR A USER EXTENSIBLE EVENT STRUCTURE which is herein incorporated by reference in its entirety. This approach may be taken for each individual subexpression of the filter with the full list being the union of nodes returned from each subexpression.

The product table 760 may include a description of the product (e.g., version), files used by the product, description of the files used by the product, and the master for a unique product ID.

The node table 740 may include, for example, all the nodes of interest in the managed environment including properties of the node such as the operating system running, the version of the operating system, hardware type, processor speed, and the master for a unique node ID specific to the node table 740. In an exemplary embodiment of the present invention, some of this information may be obtained, for example, through a discovery process including making OS specific calls to retrieve various key attributes of the system and putting that information into a message that can be sent to the central DEX data store and parsed and inserted into the node table. As shown in FIG. 7, the node table 740, for example, may be included in the DEX 710. The routing algorithm may query other data tables and data stores related to fields of the event to be used in routing determination which are not contained in the event catalog 720. Accordingly, in a filter where instance type and instance were specified, a query may be performed by the routing algorithm against a respective data table or data store, for example, using the instance field specified in the filter. The result of the query may be used to determine the respective nodes to receive the subscription request.

In an exemplary embodiment of the present invention, a remote monitoring product registers on configuration the respective node about which it is submitting events, for example, in a remote monitoring data store 770. Remote monitoring is a product submitting an event about an instance that is located on a different node than the product is located. In an exemplary embodiment of the present invention, the event management system may also provide the instance, node and event manager to a remote monitoring data store 770. Since multiple remote monitors may be on different nodes monitoring instances on a single node, a searchable data store including instance, node, and event manager node allows the determination of information of a particular node. This may be used to add the respective nodes to the list to which to subscribe to receive all events about the node of interest (e.g., those events about instances on the respective node which will be reported to event managers on other nodes due to remote monitoring). Further, multiple remote monitors may be on different nodes monitoring a single instance. Accordingly, by having the instance and event manager node in the remote monitoring data store 770, additional event managers that need to be contacted to get these events about the instance may be determined.

The filter data store 750, for example, may include the filters and the respective symbolic filter names. The symbolic filter name can be used for a subscription instead of the filter needing to be fully specified. The symbolic name will uniquely reference a filter defined, for example, in the filter data store 750. As the filters may change dynamically and subscriptions are ongoing, changes to the definition of the filter should be automatically handled, for example by the event API. The event API will, for example, encapsulate registering for notification of the update for the symbolic filter used in the subscription request. The event API may retrieve the new definition, cancel all of the old IPC requests, rerun the routing algorithm with the new filter definition and reestablish new IPC requests with the respective event managers using the new filter definition. Accordingly, the routing algorithm may, for example, query the filter data store 750 to dynamically obtain the respective updated filter 750.

In an exemplary embodiment of the present invention, the event management system includes registering interest in subject changes. A watch can be established on any subject changes to an event manager. The watch is, for example, a method whereby a communication layer will notify a client when new processes are running on machines that match certain criteria, namely that an event manager is running on that node. The watch, for example, may be implemented as a function. The results of the watch may be analyzed to determine if they match the criteria of the original filter. If it does, then a subscription to that node can be formed. Further, the user registered subscription callback function may be invoked to notify the user of the addition of the subscription to the node.

In an exemplary embodiment of the present invention, the event management system provides notification if the list of nodes needed to satisfy a filter changes while the subscriptions are outstanding. The nodes may change, for example, if the "like" operator was used and another event manager starts running or becomes visible in the network after an original call; a point product was installed on a new node; or an external reference (e.g., symbolic name used to reference a respective event filter) within a filter changed its definition, effectively changing the filter. When the filter is mapped to a data store query to determine its routing, changes to the respective data stores that the query runs against could potentially change the results of the query.

Accordingly, the event management system of the present invention includes notification of when the query results may change. Updates to the respective data stores, for example, may be controlled by a respective service processor. For example, the service processor may provide notification of an update through an interprocess communication message. Further, an event may be published on a subject area basis within the respective data store, for example, the DEX 710. A subject area is, for example, the node table 740. It may be, for example, a grouping of tables within the database. In an exemplary embodiment of the present invention, the event published indicates what subject area was updated.

The event management system includes a tracking mechanism for query change. The results of the initial query, for example, rows of data and the subject areas used in running the query, may be stored. Subscriptions for update events for the subject areas used would be created. Upon receipt of an update event for one of the subject areas, the query may be rerun. The results of the rerun would be compared with the prior query results and suitable additions or deletions of individual event manager subscription requests could be made.

In an exemplary embodiment of the present invention, the routing algorithm, for example, may use conjunction information combining each subexpression of the evaluation tree of the event filter to narrow the list of nodes where potentially an event may occur. For example, the event filter "name=DatabaseDown and name=ServerDown" includes a first subexpression "name=DatabaseDown" and a second subexpression "name=ServerDown" combined by the conjunctive "and". The routing algorithm may, for example, determine the list of nodes which may have the events occur on it by analyzing each of the subexpressions individually. As a result, the conjunction is treated as an "or". Accordingly, the list of nodes includes all nodes that have a product that can create a DatabaseDown, as well as all the nodes that have a product that can create a ServerDown. One field, for example, may not have two different values and thus, an event cannot occur that matches this filter. Accordingly, the routing algorithm, using the conjunctive "and" between the subexpression, would determine that no node could exists for the event defined by the filter. Thus, the routing algorithm will not provide this subscription request to any nodes.

This would be an example of detecting a poorly formed user subscription. Immediate notification could be given to the user that no such events will ever exist in the system, and the user would be made aware of this error and be able to correct the subscription. For other sample filters, the goal is to optimize where the subscription needs to be routed. For example, if conjunction information is not used, such as in a filter name=ServerDown and node=nodeA, evaluation of the node subexpression would result in a single node, node A, and the evaluation of the name subexpression would result in nodeA, nodeB, and nodeC. Therefore the union of the results of the evaluation of each of the subexpressions (e.g., the full list) would be nodeA, nodeB, and nodeC. But as the conjunction in this exemplary filter is an and, the full list should only be nodeA. Accordingly, no additional events will be received if the filter was routed to all three nodes. Further, there is more inefficiency in the system subscribing to nodeB and nodeC, as the respective requests will be made and the event managers located on nodeB and nodeC will evaluate the respective requests even though they will never find a match for that filter.

The filtering system of the present invention is designed to operate in a client/server environment where clients and servers could be running using different code pages. Additionally, the event filters of the present invention, for example, may be configured so that at least predefined fields of the event structure and the contents of the fields of the event structure stored in the event catalog can be automatically translated to provide localized versions of the event filters. In an exemplary embodiment of the present invention, the messages (e.g., any of the interprocess communication such as a subscription request to an event manager containing an event filter) that pass from one process to another when crossing node boundaries (e.g., the processes are running and communicating on different nodes) are mappable. The communication layer of the event management system of the present invention, tracks the code page of a message and provides a conversion mapping that may be invoked by a receiving code of the communication layer.

In an exemplary embodiment of the present invention, fields and keys of the event such as product name, name, type, condition time, and keynames, are restricted to a character set that can have unique representations across all code pages, e.g., portable character set. Thus, this restriction ensures mappings without loss. Accordingly, a one to one mapping from a character in one code page to a suitable character in the other code page will exist. In an exemplary embodiment of the present invention, the portable character set includes, for example, the characters <space>, a, b, c, d, e, f, g, h, i, j, k, l, m, n, o, p, q, r, s, t, u, v, w, x, y, z, A, B, C, D, E, F, G, H, I, J, K, L, M, N, O, P, Q, R, S, T, U, V, W, X, Y, Z, 0, 1, 2, 3, 4, 5, 6, 7, 8, 9, \, _, ', !, ", #, $, %, &, ', (, ), *, +, „, -, ., /, :, ;, <, =, ≦, ?, @, {, |, }, and ~.

In an exemplary embodiment of the present invention, the event management system includes a one to one word translation of the keys of the language. Accordingly, all of the names of fields in the event, except the extended key names, and the comparison operators may have catalog lookups for substitutions in the current language. This allows a filter to be constructed in a native language. Before the filter is used in a subscription, however, it can be translated to a common format so that a single format can be used by any remote receiver in the interpretation of the filter. All of the names of fields in the event (except the extended key names) and the comparison operators may have catalog lookups for substitutions in the current language. A bi-directional translation can be applied so that a user can view the event filter in the local language, but have the event filters used and stored by the system in a standard language. The communications between processes need not be converted as the processes will communicate with the same language. Accordingly, the standard language provides a single language that all the processes can rely on and translation may only have to be provided on presentation of the event filter to the user.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method for routing a subscription request defined by an event filter comprising the steps of:

parsing the event filter into an evaluation tree, the evaluation tree including at least one subexpression;

locating the at least one subexpression;

determining if the at least one subexpression includes a node specific field; and if the at least one subexpression includes a node specific field, creating a list of at least one of a node and event manager contact information, and transmitting the subscription request to at least one event manager located on a node that is included in the list.

2. The method of claim 1, wherein the at least one event manager creates an event that satisfies one or more subexpressions in the event filter.

3. The method of claim 1, further including:

querying a filter data store to dynamically obtains updated event filter.

4. The method of claim 1, wherein the event manager contact information is provided by a function.

5. The method of claim 1, further including:

determining if the at least one subexpression can be converted to a query against at least one of a data table or data store; and if the at least one subexpression can be converted to a query against at least one of a data table or data store, querying against the at least one of a data table or data store to obtain at least one of nodes and event manager contact information.

6. The method of claim 1, further including:

querying an event catalog to obtain a product identifier associated with a product in the event filter;

referencing the product identifier in a software inventory to associate the product with one or more physical nodes.

7. The method of claim 1, further including:

determining an event specified in the at least one subexpression;

querying an event catalog to determine one or more products that can generate the event;

querying a software inventory to determine one or more nodes where the one or more products are installed.

8. The method of claim 1, wherein the transmitting further includes:

transmitting a callback handle to the at least one event manager, wherein the at least one event manager located on a node uses the callback handle to notify an event occurring at the node.

* * * * *